United States Patent
Mente et al.

[11] 3,762,372
[45] Oct. 2, 1973

[54] PORK PRODUCTION CENTER

[75] Inventors: Glen Allen Mente; Daniel Paul Kraklow; Virgil Albert Schneider, all of Muscatine, Iowa

[73] Assignee: Kent Feeds, Inc., Muscatine, Iowa

[22] Filed: Aug. 24, 1970

[21] Appl. No.: 66,188

[52] U.S. Cl. .................................. 119/16, 119/28
[51] Int. Cl. .................................................. A01k 01/00
[58] Field of Search .................... 119/16, 20, 28

[56] References Cited
UNITED STATES PATENTS

| | | | |
|---|---|---|---|
| 3,229,663 | 1/1966 | Conover | 119/16 |
| 3,601,096 | 8/1971 | Rutherford | 119/16 |
| 3,418,975 | 12/1968 | Smith | 119/20 |
| 3,213,828 | 10/1965 | Sorensen | 119/20 |
| 1,348,343 | 8/1920 | Zimmerman | 119/20 |
| 3,181,503 | 5/1965 | Tripp | 119/20 |
| 3,556,054 | 1/1971 | Honegger et al. | 119/16 |
| 3,584,603 | 6/1971 | Rutherford | 119/16 |

Primary Examiner—Hugh R. Chamblee
Attorney—Pendleton, Neuman, Williams & Anderson

[57] ABSTRACT

A structure for raising animals such as swine in which a plurality of pens or stalls are provided with a passageway providing access thereto. The structure is provided with windowed end walls and a windowed side wall with one side being open providing for natural air circulation. The floor area of the pen area comprises a combination of a solid portion which can be heated and a slatted portion located over a manure collection pit.

3 Claims, 8 Drawing Figures

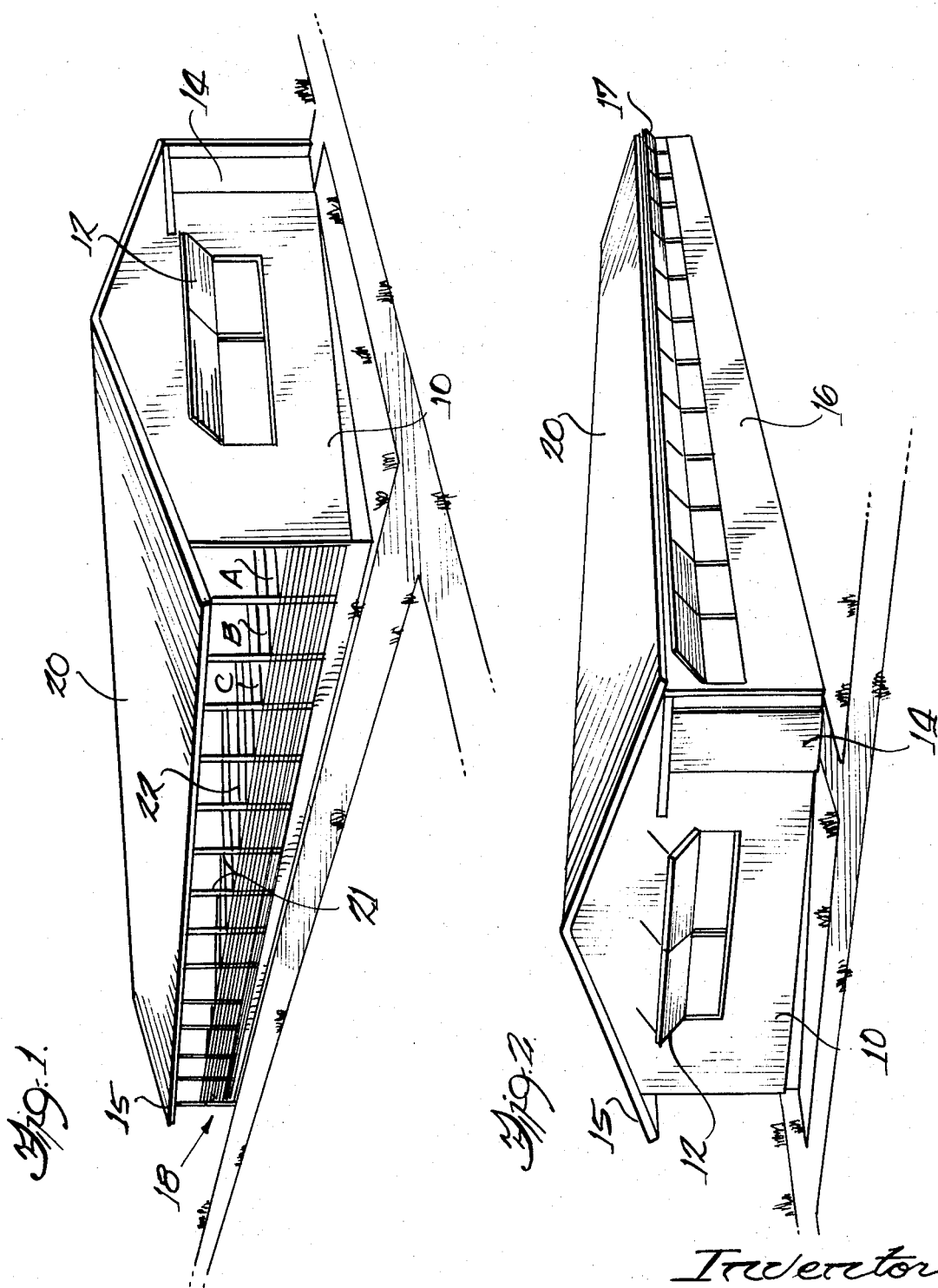

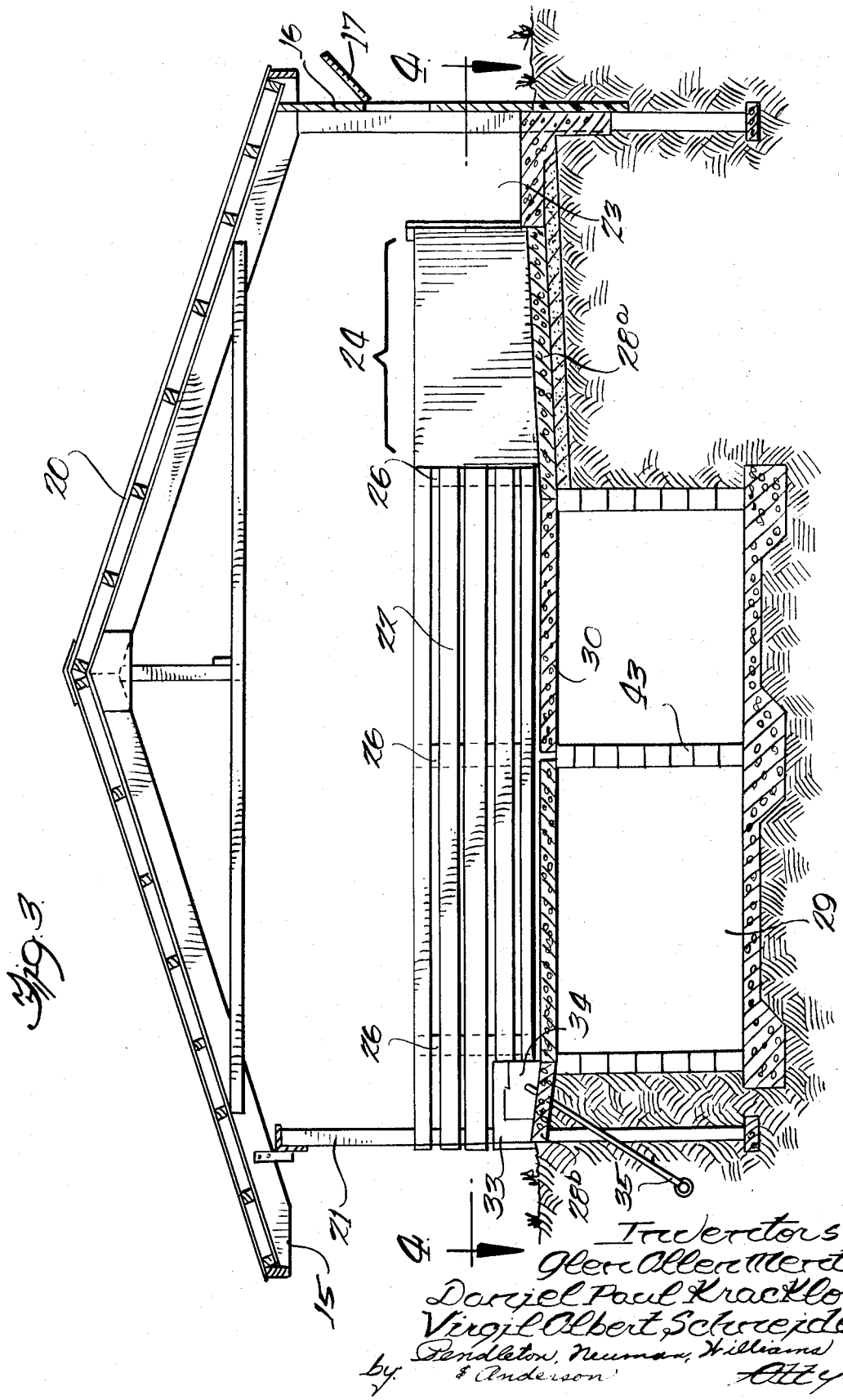

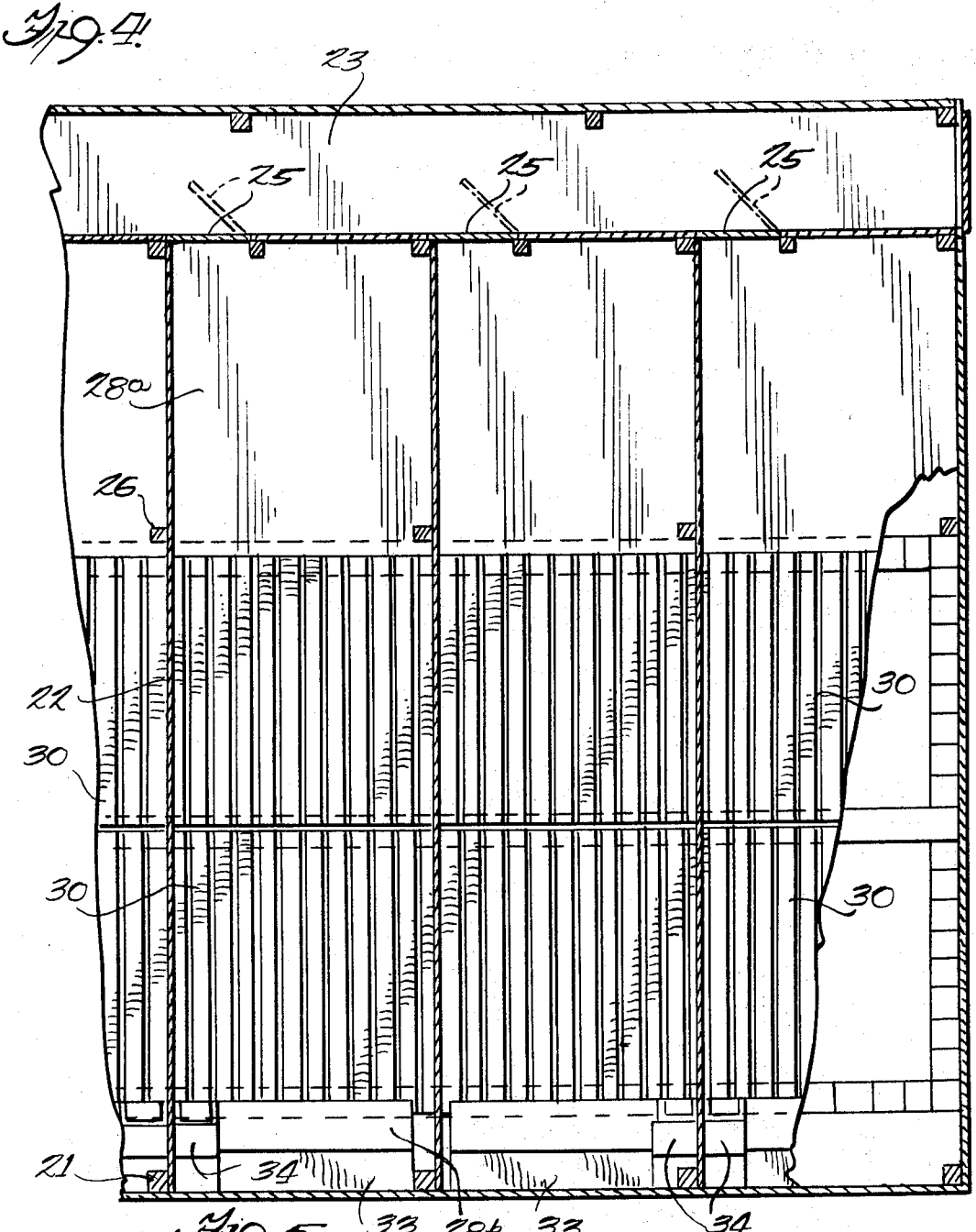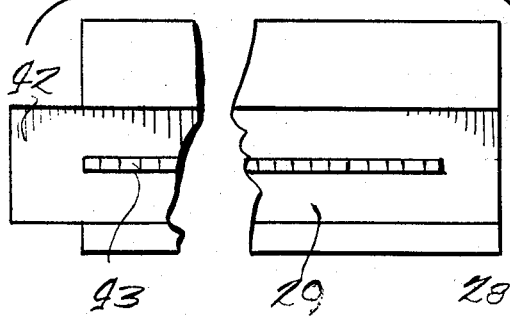

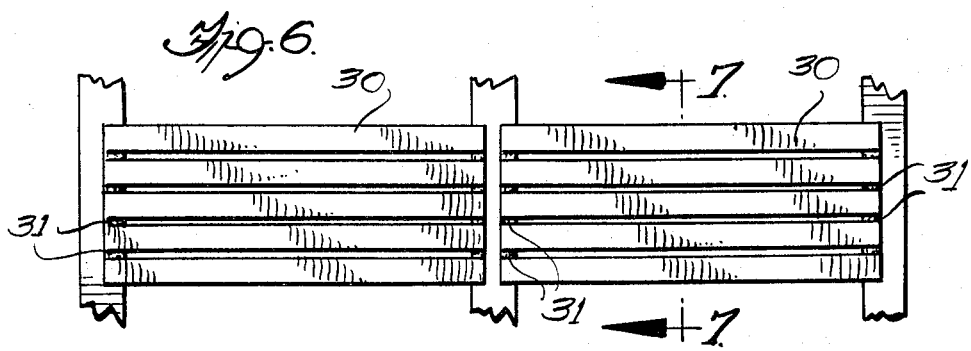
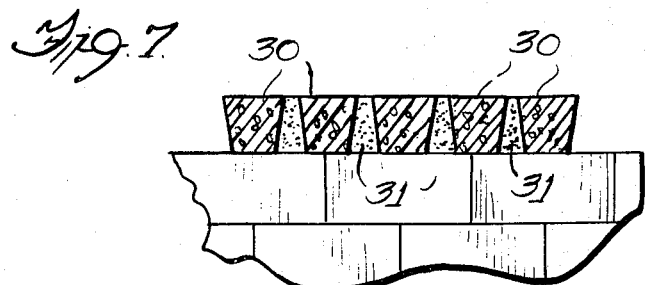
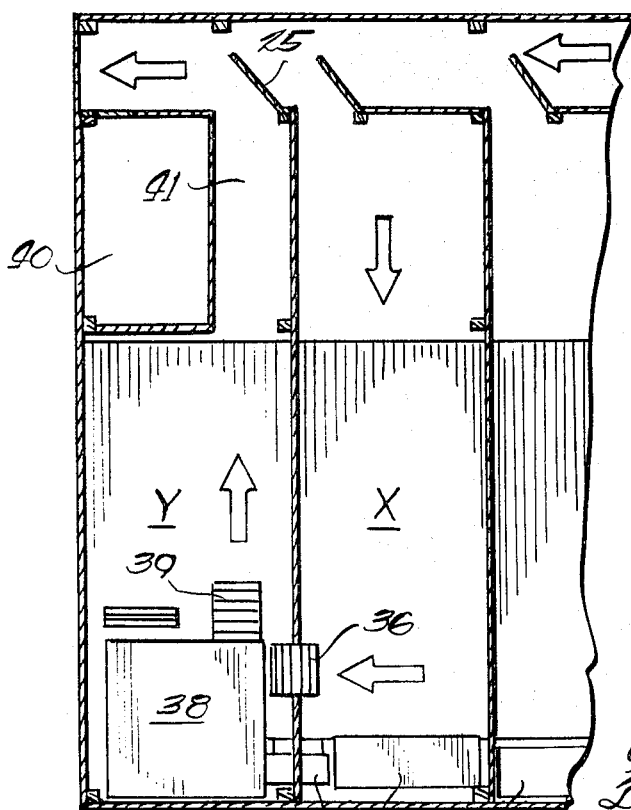

PORK PRODUCTION CENTER

This invention relates to a hog or swine house.

It is a principal object of this invention to provide a hog house which can be readily constructed and which is particularly conducive to the growing, finishing and management of hogs in a sanitary manner with minimum labor.

A preferred embodiment of the hog house is shown in the accompanying drawings wherein:

FIG. 1 is a perspective view of a hog house in accordance with the invention.

FIG. 2 is a perspective view of the hog house of FIG. 1 showing the side thereof opposite to that shown in FIG. 1.

FIG. 3 is a typical transverse elevational section showing a pen partition, a manure collection pit, footings and floor construction.

FIG. 4 is a plan view taken on line 4—4 of FIG. 3.

FIG. 5 is a diagrammatic plan view of the manure collection pit.

FIG. 6 is a plan view of the slatted floor area of a pen.

FIG. 7 is a partial elevational view taken on the line 7—7 of FIG. 6 showing details of the slatted floor arrangement.

FIG. 8 is a partial plan view of a particular pen (weighing area) of a hog house.

The hog house illustrated is a building having opposite end walls, both of which are provided with swing-out windows and doors. In the perspective views of FIGS. 1 and 2 one end wall is designated by the numeral 10 with the window and door thereof being designated by the numerals 12 and 14, respectively. Side wall 16 of the hog house is also provided with a plurality of windows 17. The opposite open side 18 permits good air circulation through the hog house. A roof 20 is supported on the end walls, side wall 16 and a plurality of building posts 21. The overhang 15 of the roof offers protection from the elements and reduces the possibility of snow and rain blowing into the pens. In addition, the walls and ceiling can be insulated to regulate temperature.

The hog house is divided internally by partitions 22 into a plurality of pens A, B, C and so on which are arranged on one side of a passageway 23 which provides access to the pens through swinging gates 25 provided with respect to each pen; these gates by double hinging being adapted for swinging in two directions. In a preferred embodiment, as shown in FIG. 3, the partitions 22 are comprised of a solid portion 24 which defines a protected sleeping area for the animals. A plurality of partition post members 26 in conjunction with building posts 21 are utilized to support the pen partitions 22. The number of pens can vary as desired with the size of the pens being, for example, 6 feet in width and 21 feet in length. The width of passageway 23 can suitably be 3 feet, thus providing a hog house having an overall width of approximately 24 feet.

Referring more particularly to FIG. 3, the floor of the pen area is made of two solid concrete portions 28a and 28b which slope slightly downwardly to direct waste into manure collection pit 29. Intermediate the solid floor portions 28a and 28b is a slatted concrete floor area 30. As shown (FIG. 7), the slots comprising the area 30 are in the form of essentially inverted truncated triangles to minimize the possibility of manure collecting therebetween. While subject to considerable variation, overall the pen floor area suitably comprises about 60% slatted area (30) and 40% solid area (28a and 28b) with the spacing between the individual slats being on the order of one inch at the uppermost point, this spacing being maintained by means of mortar spots 31 between each slat at the supported end thereof. With a ratio of 60% slatted area to 40% solid area a 1 inch slope per 10 feet is satisfactory. However, if this ratio is changed to 30% slatted area : 70% solid area a slope of about 0.5 inch per foot is preferred.

The comfort and well-being of the hogs is achieved economically by providing for heating of the solid floor or sleeping area 28a. This is accomplished by embedding in the concrete floor area coils through which heated water is circulated. The heating coils as well as the required boiler and pump system are not illustrated in the drawings inasmuch as these elements are well known to those skilled in the art.

With respect to the physical needs of the animals, a feed trough 33 is provided adjacent the end of each pen on the solid floor portion 28b to minimize waste from spillage. Drinking water is supplied through water pipe 35 to water pan 34 which can be located adjacent to or on the floor slats.

In one particularly preferred embodiment of the invention, an area thereof is adapted for weighing of the animals. This embodiment is illustrated in FIG. 8 of the drawings wherein two of the pens, such as, for example, pens X and Y located adjacent the end of the building, are modified to form a weighing station. Thus, a ramp 36 leads from pen X to scale 38 wherein weighing of the animals is carried out. After weighing, the animals are made to descend down ramp 39 into pen Y. The path the animals traverse for the weighing operation is indicated by the arrows. A portion of pen Y can be fenced or partitioned as at 40 to form a relatively narrow passageway or alley 41 to facilitate egress of the animals from the weighing station.

It is to be noted (FIG. 5) that manure collection pit 29 extends beyond the hog house with a pump out portion 42 being located outside of the hog house to permit access thereto. Also, as seen in FIG. 5, the center concrete block partition 43 does not extend completely to the opposite end of the pit 29 so that manure can be circulated to suspend the solids when the pit is being pumped out.

The numerous advantages of the hog house of this invention will be apparent from the foregoing description. Among its advantages are: (1) low cost and ease of construction; (2) low maintenance cost; (3) low labor requirements since daily cleaning is not necessary and automatic waterers and self-feeding equipment can be employed; (4) ease of movement of animals in and out of the hog house; (5) natural ventilation minimizes odors; (6) cleanliness of pigs is achieved by virtue of the ratio of slatted floor to solid floor area; (7) heated floor sleeping areas eliminate requirement for bedding; and (8) liquid manure collection system reduces manure handling and maintains fertilizing properties thereof.

Those modifications and equivalents which fall within the spirit of the invention are to be considered a part thereof.

What is claimed is:

1. An animal house for growing and finishing hogs comprising in combination
    a roof,
    a pair of windowed end walls, a substantially open side wall, a plurality of partitions within said house defining a plurality of pens which extend along the substantially open side wall, at least a portion of said partitions being of solid construction to define a relatively draft-free hog sleeping area, a side wall opposite substantially open side wall having a plurality of windows therein with the bottom of said windows being located in a horizontal plane not substantially lower than the horizontal plane intersecting the upper end of said pen-defining partitions, a passageway extending longitudinally within said house adjacent the side wall having a plurality of windows therein, a solid sloped portion ranging from about 40 to 70% of the floor area of each pen having embedded therein coils for circulation of water with said solid sloped portion defining the floor area of the hog sleeping area, a second substantially horizontally disposed portion of the floor area of each pen being slatted with said slatted floor area being entirely disposed over a deep collection pit which extends beyond the confines of the animal house, a feed trough adjacent to or on the slatted floor portion of each of said pens but spaced from said hog sleeping area, and a water trough located adjacent to or on the slatted floor portion of each of said pens but spaced from said hog sleeping area.

2. An animal house in accordance with claim 1, wherein there is disposed within one of said pens a scale, a ramp leading from said scale and a second ramp leading from an adjacent pen to said scale.

3. An animal house in accordance with claim 1 wherein there is a double hinged gate attached to each of said pens.

* * * * *